Figure 1:
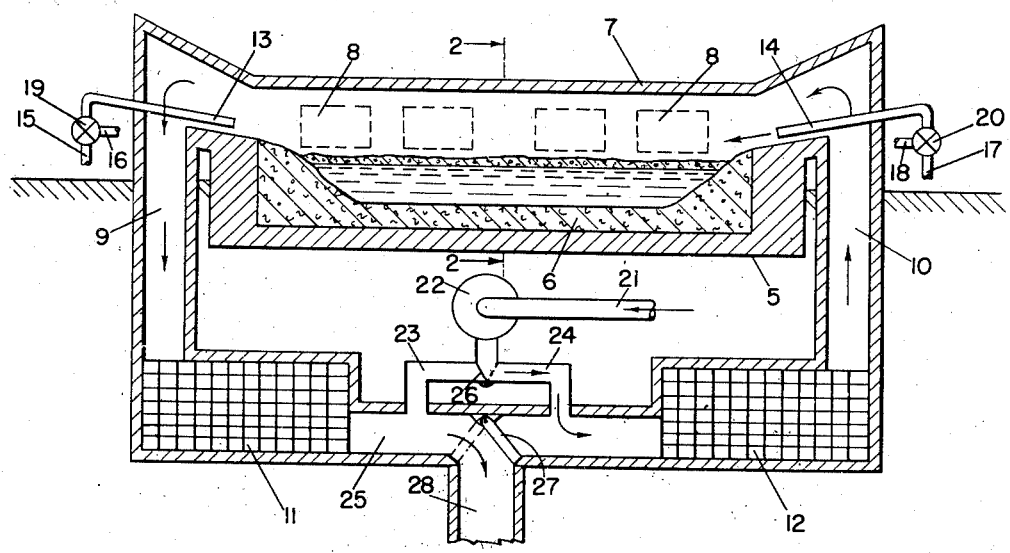

Jan. 1, 1952   G. V. SLOTTMAN   2,580,614
MANUFACTURE OF OPEN HEARTH STEEL
Filed Feb. 15, 1947

INVENTOR
GEORGE V. SLOTTMAN
BY *Bonnie, Edmonds,*
*Morton and Barrows*
ATTORNEYS Patented Jan. 1, 1952

2,580,614

UNITED STATES PATENT OFFICE 2,580,614

MANUFACTURE OF OPEN-HEARTH STEEL

George V. Slottman, New York, N. Y., assignor to Air Reduction Company, Incorporated, New York, N. Y., a corporation of New York Application February 15, 1947, Serial No. 728,868

2 Claims. (Cl. 75—60)

This invention relates to the manufacture of open hearth steel and particularly to an improved method of reducing the carbon content of the steel near the end of the heat and before the metal is tapped.

In the usual practice of the open hearth process, either basic or acid, the metal reaches, near the end of the heat, a condition in which the various elements are present in the required proportions except that the carbon content is usually excessive. In order to reduce the carbon to the desired point, it is customary to introduce iron oxide in the form of iron ore. The iron oxide disperses through the slag and partly diffuses into the metal, where it reacts with carbon to form carbon monoxide gas. The latter bubbles through the slag and escapes with the stack gases.

The reaction $FeO+C=CO$ is endothermic and lowers the temperature of the molten metal. Addition of cold ore to the slag also lowers its temperature. Appreciable time is required for the iron oxide to diffuse into the metal and react, and it also requires time to bring the temperature of both metal and slag back to its former level after each addition of ore. Consequently, if considerable carbon has to be removed in order to obtain the desired analysis, all of the ore necessary cannot be added at once because the loss of temperature would be too great. Hence it is usually added in relatively small lots with an interval between additions to allow the reaction to proceed and to permit readjustment of the temperature.

In the lower ranges of carbon analysis, particularly below 0.1%, the action of ore in removing carbon is very slow. To approach an analysis as low as 0.02%, decarburization with ore is not only slow but very uncertain. Relatively large additions of ore are necessary, with unavoidable contamination of the slag by silica and other impurities contained in the ore. This necessitates further additions of lime to maintain the proper lime-silica ratio in the slag. The overall result is further lowering of the temperature of slag and metal, which has to be brought up by heat transfer from the furnace flame. Also, the volume of the slag is increased, further insulating the molten metal and decreasing the metal yield.

Thus, the normal procedure, although it has been utilized for many years in commercial practice, is undesirable because of the incident delays and uncertainties.

It is the object of the present invention to provide a simple, effective and an economically practicable method of reducing the carbon content of steel in an open hearth furnace before the metal is tapped.

Figure 2:
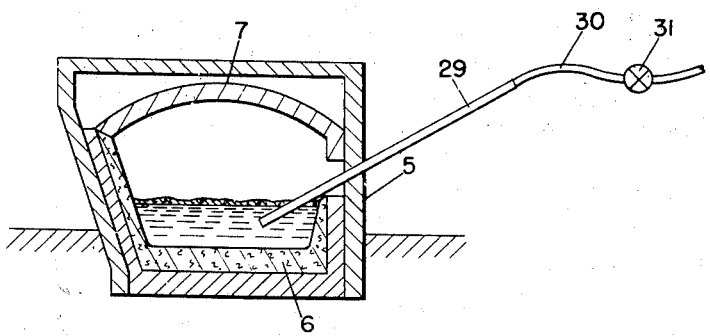

Other objects and advantages of the invention will be apparent as it is better understood by reference to the following specification and the accompanying drawing, in which Fig. 1 is a longitudinal section, in diagrammatic form, through an open hearth furnace; and Fig. 2 is a transverse section through the hearth of the furnace on the line 2—2 of Fig. 1.

I have discovered that the carbon content of steel in the open hearth furnace can be reduced more effectively, rapidly and economically by the introduction of oxygen to the metal. Molten steel is capable of absorbing relatively large quantities of oxygen which diffuses rapidly through all of the metal and reacts with the oxidizable impurities, particularly carbon. The rate of diffusion is in fact very great. Thus, when the molten metal contains appreciable quantities of carbon (e. g., 0.5%), oxygen may be introduced through a single pipe at any point in a hearth approximately forty feet in length, and the effect becomes immediately apparent over the entire surface of the slag covering, where the flames of carbon monoxide appear. The reduction of the carbon content proceeds rapidly to approximately 0.1%. Thereafter the rate of reaction is lowered, but is still sufficient to gradually reduce the carbon content to as low as 0.02%. The reaction is much more rapid for the entire carbon range than is possible through the addition of iron ore. Furthermore, it is exothermic and therefore does not reduce the temperature of the slag and metal. Also, it does not result in the addition of impurities, either to the metal or to the slag, and avoids all of the difficulties heretofore inherent in the customary practice. The reaction in the lower carbon ranges (i. e., below 0.1%) may be accelerated, if desired, by introducing oxygen at a plurality of points along the hearth. When a plurality of pipes are thus employed, the efficiency of oxygen usage is also increased.

Although oxygen of commercial purity, that is 99.5% or better, is most suitable for the purpose, it is not essential. Oxygen of purity ranging from 45% to 99.5% or better may be utilized for the purpose. The reaction is slower with lower grades of oxygen, but nevertheless the carbon may be reduced effectively and more satisfactorily with respect to certainty of results than by the method as heretofore practiced.

The oxygen can be introduced to the bath by means of one or more ferrous metal pipes connected by a suitable hose to a source of oxygen.

It is obvious that an unprotected steel or iron pipe, if heated to combustion temperature in the presence of oxygen, will burn rapidly, so that it cannot be maintained beneath the surface of the molten metal in the hearth. I have discovered that this difficulty can be substantially avoided, however, provided the apparent velocity (i. e., cubic feet of gas at 70° F. and atmospheric pressure per second per square foot of pipe cross section) of the gas flowing through the pipe is maintained at a rate in excess of 700 feet per second, and preferably at or above 1000 feet per second. As a forty foot hearth normally contains about 200 tons of molten steel, and as the amount of oxygen which will pass through a one inch pipe at a linear velocity of 1000 feet per second is approximately 20,000 cubic feet per hour, about 98 cubic feet, or about eight pounds of commercially pure oxygen per ton of steel per hour will be introduced into the molten steel at said velocity. When the oxygen is introduced at such a velocity, it absorbs the heat from the pipe fast enough, so that the burn-off rate thereof is sufficiently low to make the operation practicable. The submerged end of the pipe will gradually melt and a new pipe must be introduced at intervals, but the melting rate is negligible as compared with destruction of the pipe by oxygen.

In carrying out the invention, with an unprotected steel or iron pipe of given size, oxygen is supplied at such a pressure that, taking into account the back pressure due to the degree of submersion, the minimum velocity of the oxygen will be maintained. If two or more such pipes are employed at the same time, supplied from the same source of oxygen, it is necessary either to increase the pressure of the oxygen or to use pipes of smaller diameter so that the required velocity is maintained in each pipe.

Referring to the drawing, 5 indicates an open hearth furnace having a hearth 6, a roof 7, charging doors 8 and flues 9 and 10 at the ends leading to the regenerative checkerwork 11 and 12. Burners 13 and 14 are disposed at the ends of the hearth and are adapted to be supplied with fuel and steam or air through pipes 15, 16, 17 and 18 controlled by valves 19 and 20.

Air from an intake 21 is delivered by a blower 22 through branch passages 23 and 24 to a flue 25 connecting the regenerators 11 and 12. A valve 26 is adapted to be manipulated to direct the air through either of the passages 23 or 24 as may be desired. A valve 27 in the flue 25 is similarly manipulated to direct the products of combustion into a flue 28 leading to the stack (not shown). As will be understood, the incoming air is directed alternately through the regenerators 11 and 12, and fuel such as oil, gas or pulverized coal is fed to the burner 13 or 14, depending upon the direction of flow of the heated air. The products of combustion pass through the opposite regenerator to the stack.

In carrying out the present invention, a pipe 29 is inserted through one of the charging doors 8, and the lower end is thrust beneath the slag layer into the metal on the hearth. Oxygen is supplied through a hose 30 controlled by a valve 31. The time required will vary depending upon the initial carbon content of the metal, at the rate of oxygen flow, and on other factors. If one or more of the pipes 29 is consumed by melting, a new one is inserted. It is desirable, in attaining low carbon analyses below 0.1%, to insert two or more pipes 29 through the various charging doors, but generally introduction at one point is sufficient to accomplish the purpose of the invention in carbon ranges above 0.1%.

A 20-foot length of iron pipe will be about two-thirds consumed in from 8 to 12 minutes. During this interval, such a pipe, having an internal diameter of 1 inch, will pass about 3330 cubic feet of oxygen (at 70° F. and one atmosphere) at an apparent linear velocity of 1010 feet per second. I have found that when oxygen is introduced at this rate, the efficiency of the reaction with carbon is close to 100%, as long as the carbon content of the metal remains above 0.1%. After the carbon content of the molten metal has been reduced to about 0.3%, and until it is reduced to about 0.1%, a general boiling of the molten metal is noted over the surface of the entire bath area, due to the diffusion of iron oxide throughout the molten metal and its combination with carbon to form carbon monoxide. The carbon monoxide in the form of tiny bubbles bursts through the slag over its entire area and the blue flame resulting from its ignition can be noted over the entire slag area. It is immaterial where the pipe is inserted in the bath. In other words, the reaction $C+O=CO$ is quantitatively attained by the procedure in this range.

The volume of gas necessary to remove one pound of carbon by this reaction is 15 cubic feet when measured at standard pressure and temperature. Thus, if a 200-ton heat melts down at 0.5% carbon and the analysis desired is 0.2%, the oxygen required to lower the bath to this point would be $2000 \times 200 \times .003 \times 15 = 18,000$ cubic feet. Below 0.1%, the efficiency of oxygen usage in eliminating carbon falls off until, around 0.03% carbon, the efficiency is about 30% when using only one pipe. At this time, the greater portion of the area of the bath lies quietly, and the only evidence of carbon monoxide evolution is in a limited area where the pipe is working. The efficiency can be increased in this range (i. e., below 0.1%) if the number of pipes is increased, so that the distance through which the oxygen must diffuse to meet the carbon is decreased.

Practical operation of the method as described has demonstrated that from one to three hours may be cut from the charge to tap heat cycle on large open hearth furnaces by employing the method of carbon reduction described herein. The operation is, as indicated, extremely simple, and entirely practicable. Two men can easily hold the pipe during the introduction of oxygen to the metal, and the simple equipment used can readily be removed to clear the charging floor for scrap traffic. The only necessary precaution is to see that the end of the pipe is held beneath the slag-metal interface, since the introduction of oxygen to the slag effects no useful purpose.

Various changes may be made in the procedure as described without departing from the invention or sacrificing the advantages thereof.

I claim:

1. In the production of medium and low carbon steel in an open hearth furnace, the improvement which comprises introducing oxygen into molten steel containing less than 0.5% carbon while it is on the hearth to reduce the carbon content thereof, the oxygen being introduced at an apparent linear velocity in excess of about 1000 ft./sec. through a bare ferrous metal pipe unprotected from the heat of the molten metal and having its discharge end submerged in said molten metal so that the oxygen is delivered through said pipe at said velocity into the molten metal at a point a substantial distance below the surface thereof.

2. In the production of low carbon steel in an open hearth furnace, the improvement which comprises introducing oxygen into molten steel containing not substantially more than 0.5% carbon while it is on the hearth until the carbon content thereof has been reduced to below 0.1%, the oxygen being introduced at an apparent linear velocity in excess of about 1000 ft./sec. through a bare ferrous metal pipe unprotected from the heat of the molten metal and having its discharge end submerged in said molten metal so that the oxygen is delivered through said pipe at said velocity into the molten metal at a point a substantial distance below the surface thereof.

GEORGE V. SLOTTMAN.

REFERENCES CITED

The following references are of record in the file of this patent:

UNITED STATES PATENTS

| Number | Name | Date |
| --- | --- | --- |
| 67,350 | Richardson | July 30, 1867 |
| 86,859 | Phillips | Feb. 9, 1869 |
| 586,047 | Last et al. | July 9, 1897 |
| 1,484,465 | Billings | Feb. 19, 1924 |
| 1,513,735 | Bigge | Nov. 4, 1924 |
| 1,570,229 | Browne | Jan. 19, 1926 |
| 2,226,967 | Chelius | Dec. 31, 1940 |

FOREIGN PATENTS

| Number | Country | Date |
| --- | --- | --- |
| 468,316 | Belgium | Oct. 4, 1946 |
| 735,196 | Germany | July 3, 1943 |
| 252,267 | Italy | Mar. 7, 1927 |

OTHER REFERENCES

The Iron Age, Feb. 20, 1947, pages 42 to 45, incl., published by the Chilton Co., Philadelphia, Pa.

U. S. Bureau of Mines Report of Investigations, No. 2502, pages 31, 32, and 33.

Electric Furnace Steel Proceedings, 1945, vol. 3, A. I. M. M. E., New York, N. Y., pages 125–127.